3,172,751
PROCESS FOR PRODUCING NITROGEN-PHOSPHATE FERTILIZERS FROM AMMONIUM ACID SULFATE AND PHOSPHATE ROCK
Richard C. Datin, Petersburg, Va., assignor to Allied Chemical Corporation, New York, N.Y., a corporation of New York
No Drawing. Filed Jan. 17, 1963, Ser. No. 252,050
5 Claims. (Cl. 71—37)

This invention relates to a process for manufacturing nitrogen-phosphate fertilizer base materials from phosphate rock and sulfated ammonium. More particularly, this invention relates to a process for manufacturing nitrogen-phosphate fertilizer base materials from phosphate rock and ammonium acid sulfate.

In the process of making fertilizers with nitrogen and phosphate content it has formerly been proposed to react phosphate rock material with ammonium acid sulfate and in that manner prepare the phosphate for suitable use as a fertilizer. This process is particularly pointed out in U.S. Patent 1,638,677 wherein a process for preparing phosphate rock is disclosed. In that patent, $Ca_3(PO_4)_2$ (phosphate rock) is reacted with $NH_4HSO_4$ by placing the phosphate rock in a closed retort and heating it together with $(NH_4)_2SO_4$ at a temperature up to about 300° C. This process can be performed at elevated pressures of about 10 pounds to obtain high conversion of $P_2O_5$ in the rock to available form.

As a result of this process the final product in the retort is a mixture of ammonium mono meta phosphate together with other phosphates such as ammonium pyrophosphate $((NH_4)_2P_2O_7)$ with calcium pyrophosphate $(Ca_2P_2O_7)$ and calcium sulfate. These pyrophosphates are, however, disadvantageous in that they are relatively poorly water soluble and, therefore, their agronomic value is considerably decreased if a fertilizer base material containing readily available phosphates is desired. It is said that the process of the patent is 90% efficient when performed at elevated pressures but the efficiency of the reaction is considerably decreased when the process is performed at atmospheric pressure, i.e. only a 75% efficiency is obtained. The poor efficiency of this process when carried out at atmospheric pressure makes it disadtageous for commercial practice. The process when performed under pressure is undesirable since it is necessary to provide the requisite pressure equipment, namely closed vessels and the like, to obtain efficiency from an economical view point in the conversion of the phosphate in phosphate rock to a more available form.

An object of this invention is, therefore, to provide a process whereby phosphate rock can be readily and efficiently converted to a fertilizer material. Another object of this invention is to provide a process whereby one can readily convert phosphate rock to a suitable fertilizer base without the necessity of utilizing pressure equipment and the like. A further object of this invention is to provide a process which efficiently yields water soluble phosphate fertilizer ingredients. Still another object of this invention is to provide an economical means of converting phosphate rock to fertilizer base without the necessity of utilizing high temperatures and the like. Other objects and advantages will become apparent from the following more complete description and claims.

Broadly, this invention contemplates a process for preparing a nitrogen-phosphate fertilizer base which comprises reacting an aqueous solution of ammonium acid sulfate said solution having a concentration of ammonium acid sulfate between about 50% and about 70% by weight with phosphate rock at temperatures of between about 100° C. and 150° C. to form a nitrogen-phosphate fertilizer base.

In a particularly desirable embodiment, this invention contemplates a process of preparing a nitrogen-phosphate fertilizer base which comprises the steps of pyrolyzing ammonium sulfate at temperatures of 350–450° C. to form ammonium acid sulfate, dissolving the reaction product in water amounting to 30–50 weight percent of the ammonium acid sulfate solution, and treating phosphate rock with the aqueous solution so obtained at temperatures of 100–150° C. to form a nitrogen phosphate fertilizer base.

In order to more fully illustrate the reaction of my process the following equation is set forth:

$$Ca_3(PO_4)_2 + 3NH_4HSO_4 \rightarrow NH_4H_2PO_4 + (NH_4)_2HPO_4 + 3CaSO_4$$

I have found that the products obtained by my process enable the phosphates contained therein to be in a highly available form and to be relatively highly water soluble. I provide a conversion of the phosphate in phosphate rock to available form at an efficiency in excess of 90% by reacting within critical temperature limits ammonium acid sulfate in an aqueous solution of critical concentration with phosphate rock. In so doing, I provide a process which can be performed in standard equipment under atmospheric pressure and I obviate the necessity for employing pressure equipment, closed vessels and the like.

I have discovered that by using an aqueous solution of ammonium acid sulfate having a concentration between about 50% and about 70% by weight with temperatures between 100–150° C., I can provide a process which is above 90% efficient at atmospheric pressure for converting the $P_2O_5$ content of phosphate rock to available form. I have also discovered that by using said aqueous solution of ammonium acid sulfate instead of employing ammonium acid sulfate in a solid form, I can provide a process for converting phosphate rock into a nitrogen-phosphate fertilizer base wherein the $P_2O_5$ availability in the resulting product is superior to 90% and wherein the application of high heats in the order of 300° C. is avoided.

In the practice of this invention ground phosphate rock is reacted with the said aqueous solution of ammonium acid sulfate which is maintained at temperatures of between 100° C. and 150° C. After mixing, the reaction mass is dumped into a "den" and then transferred to bulk storage for "curing." The object of "denning" and "curing" is to complete the chemical reactions involved. The final product is a nitrogen-phosphate fertilizer base material having a composition of 12 to 14% available $P_2O_5$, 6 to 8% total nitrogen and 3 to 6% free acid (as sulfuric acid).

As indicated above, the concentration of the aqueous solution of ammonium acid sulfate is critical as well as the temperatures at which the process is performed. Use of a much stronger solution than 70% by weight ammonium acid sulfate such as 75% solution and stronger, I have found, causes the reaction temperature of the mass to become excessive as a result of the limited available water present to evaporate. Similarly, when temperatures in excess of 150° C. are employed the same phenomenon will be observed. These conditions result in an undesirably hard dense product with reduced conversion of the phosphate in phosphate rock to the desired available forms. On the other hand, treating phosphate rock with ammonium acid sulfate containing much over 50% by weight water at temperatures below 100° C. results in a limited reaction temperature rise and limited evaporation of water present. These conditions result in an undesirably moist product and, accordingly, they are to be avoided. It will be recognized that when the temperature approaches 150° C. that the water will tend to evaporate and the product so obtained will not be the most desirable. I, therefore, prefer to operate my process at temperatures between 120–125° C. to obtain the most suitable product with the attendant excellent conversion of the phosphate in phosphate rock. It is seen, therefore, that for a conversion in excess of 90% of phosphate in phosphate rock to an available form of phosphate wherein the phosphate has relatively excellent water solubility, the conditions of this process, as set forth, must be followed.

The process of this invention may be carried out in any suitable vessel including an open retort. The selection of a vessel will be largely within the skill of the art as deduced from the teachings herein.

In the preferred commercial application of this invention, ammonium sulfate is first pyrolyzed by the application of heat thereby yielding ammonia (which may be recycled) and ammonium acid sulfate, which can contain minor amounts such as 0–15 weight percent of unreacted ammonium sulfate. This step is performed at temperatures between about 350° C. and 450° C. This pyrolysis product is then dissolved in water so as to form an aqueous solution having a concentration of about 60% ammonium acid sulfate by weight and afford about a 10%–25% excess of ammonium acid sulfate over that theoretically required by the above equation. Ground phosphate rock is then mixed with the aqueous solution maintained at temperatures between 100° C. and 150° C. (preferably 120–125° C.). After a short while (about 5 minutes) the mixed reaction mass is dumped into a den for "denning" and later transferred to bulk storage for "curing." From this process, a nitrogen-phosphate fertilizer base is produced without the necessity of resorting to pressure equipment, high temperatures and the like.

In order to more fully illustrate the nature of the invention and the manner of practicing the same, the following examples are presented.

*Example 1*

A nitrogen-phosphate base fertilizer was prepared by thoroughly mixing in conventional equipment 4560 parts of Florida phosphate rock with an aqueous solution at a temperature of 120° C. containing 7080 parts of ammonium acid sulfate and 4720 parts of water. This solution represents 10% excess ammonium acid sulfate over theoretical for conversion of the $P_2O_5$ content of the rock in accordance with the above equation. After mixing about 5 minutes, the hot reaction mass was dumped from the mixer into a "den" and allowed to cool to ambient temperature over a period of 48 hours. The composition of the "denned" product as determined by the usual methods of analysis was as follows:

| | Percent |
|---|---|
| Total nitrogen (ammonical) | 7.32 |
| Total $P_2O_5$ | 13.37 |
| Water soluble $P_2O_5$ | 11.78 |
| Citrate insoluble $P_2O_5$ (AOAC Method) | 0.85 |
| Available $P_2O_5$ | 12.52 |
| Available $P_2O_5$, water soluble | 94.0 |
| Free acid as $H_2SO_4$ | 5.33 |
| Water | 0.38 |

The product obtained in accordance with this example was moderately dense, free-flowing and granular. Its physical properties were typical of commercial fertilizers presently in use.

In this example it is seen that 94 percent of the $P_2O_5$ in the phosphate rock has been made "available" for a nitrogen-phosphate fertilizer base. The efficiency of the conversion (94 percent) is due to the use of a solution of ammonium acid sulfate containing 30–50% water at temperatures between 100° and 150° C.

*Example 2*

A complete 9–9–9 fertilizer was prepared using phosphate rock treated as in Example 1 with a solution of ammonium acid sulfate as the source of all the $P_2O_5$ and part of the nitrogen in accordance with the following formulation:

| | Parts |
|---|---|
| Ammonium acid sulfate-treated phosphate rock | 1450 |
| KCl (59.3% $K_2O$) | 307 |
| Dolomite | 59.6 |
| Nitrogen solution ("Nitrana" 3–26.3% $NH_3$, 55.5% ammonium nitrate, 18.2% water) | 184 |

The fertilizer was prepared by tumbling dry ingredients in a conventional rotary drum while adding the nitrogen solution during a five minute period. The mixture attained a temperature of 40° C. during the addition of the solution. Tumbling was continued for ten minutes to assure thorough mixing. The composition of the fertilizer as determined by the usual methods of analysis was as follows:

| | Percent |
|---|---|
| Total nitrogen | 8.71 |
| Total $P_2O_5$ | 9.48 |
| Citrate insoluble $P_2O_5$ | 0.37 |
| Available $P_2O_5$ (96% of total) | 9.11 |
| Water soluble $P_2O_5$ | 7.40 |
| Available $P_2O_5$, water soluble | 81.2 |
| $K_2O$ | 10.62 |
| Water | 2.28 |

Product pH 6.

In carrying out the process of this invention and to more fully insure the excellent efficiency of conversion of the phosphate in phosphate rock to a more "available" form for the purpose of forming an ingredient of a fertilizer, it is necessary to react the phosphate rock with at least a small excess amount of the solution of ammonium acid sulfate over that theoretically required to react with the phosphate rock by the foregoing equation. It is to be preferred that this excess amount be in the range of about 10%–25%.

It is not fully understood why the reaction efficiency is so high particularly in view of the absence of application of pressure equipment, closed retorts and the like. However, it is thought that this phenomenon is due to the use of an aqueous solution of ammonium acid sulfate in the given critical concentration ranges. It is also considered that the reaction efficiency is due to the control of the critical temperatures of the system in which the reaction is being performed, i.e. within the temperature range between about 100° C. and 150° C. (preferably between 120–125° C.). While these reasons are believed to account for the increased conversion of phosphate to an available form, the instant invention should not be limited in view of the above explanations.

Although certain preferred embodiments of this invention have been disclosed, these have been disclosed only for purposes of illustration and not for purposes of limitation for certain modifications may appear apparent to one skilled in the art. For this reason, the present invention should be construed only in the light of its spirit and scope.

I claim:

1. In the process of preparing a nitrogen-phosphate fertilizer base wherein phosphate rock is reacted with ammonium acid sulfate and the reaction mass is denned and cured, the improvement which comprises reacting said ammonium acid sulfate in the form of an aqueous solution having a concentration of ammonium acid sulfate between about 50 percent and about 70 percent by weight at a temperature of between about 100° C. and 150° C. and recovering a nitrogen phosphate fertilizer base material having a composition of 12 to 14% available $P_2O_5$, 6 to 8% total nitrogen and 3 to 6% free acid (as sulfuric acid).

2. A process in accordance with claim 1 wherein said aqueous solution has a concentration of about 60 percent by weight of said ammonium acid sulfate.

3. A process in accordance with claim 1 wherein said temperature is between about 120° and 125° C.

4. A process in accordance with claim 1 wherein said phosphate rock is reacted with about a 10–25 percent excess amount of said solution of ammonium acid sulfate over the 3:1 mol ratio theoretically required to react with the $P_2O_5$ content of phosphate rock.

5. A process in accordance with claim 2 wherein said temperature is between 120° and 125° C.

References Cited by the Examiner

UNITED STATES PATENTS

| | | | |
|---|---|---|---|
| 1,258,106 | 3/18 | Gardiner | 23—106 |
| 1,638,677 | 8/27 | Blumenberg | 23—106 |
| 1,871,195 | 8/32 | Ober et al. | 71—37 |
| 1,916,429 | 7/33 | Larsson | 71—37 |
| 2,038,788 | 4/36 | Harvey et al. | 71—40 |
| 2,716,591 | 8/55 | Thomsen | 71—37 |

DONALL H. SYLVESTER, *Primary Examiner.*

ANTHONY SCIAMANNA, *Examiner.*